(12) United States Patent
Vanchozker

(10) Patent No.: US 11,006,790 B2
(45) Date of Patent: *May 18, 2021

(54) DISPENSER ASSEMBLY WITH STORAGE COMPARTMENT

(71) Applicant: Yoiel Vanchozker, Monroe, NY (US)

(72) Inventor: Yoiel Vanchozker, Monroe, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/784,378

(22) Filed: Feb. 7, 2020

(65) Prior Publication Data

US 2020/0170462 A1 Jun. 4, 2020

Related U.S. Application Data

(63) Continuation of application No. 16/103,153, filed on Aug. 14, 2018, now Pat. No. 10,595,687.

(60) Provisional application No. 62/546,274, filed on Aug. 16, 2017, provisional application No. 62/546,262, filed on Aug. 16, 2017.

(51) Int. Cl.
| | |
|---|---|
| *A47K 10/46* | (2006.01) |
| *A47K 10/42* | (2006.01) |
| *A47K 10/44* | (2006.01) |
| *A47K 10/32* | (2006.01) |
| *B60R 7/08* | (2006.01) |

(52) U.S. Cl.
CPC ............ *A47K 10/46* (2013.01); *A47K 10/421* (2013.01); *A47K 10/426* (2013.01); *A47K 10/44* (2013.01); *A47K 2010/3233* (2013.01); *B60R 7/084* (2013.01)

(58) Field of Classification Search
USPC ...................................................... 221/33–63
See application file for complete search history.

(56) References Cited

U.S. PATENT DOCUMENTS

| | | | |
|---|---|---|---|
| 4,913,311 A | 4/1990 | Garcia | |
| 2003/0178436 A1 | 9/2003 | Ashford | |
| 2009/0152161 A1* | 6/2009 | St. Cyr | ................. A45C 11/00 206/581 |
| 2011/0204078 A1* | 8/2011 | Mulhem | ................ B60N 3/101 221/45 |

* cited by examiner

*Primary Examiner* — Gene O Crawford
*Assistant Examiner* — Ayodeji T Ojofeitimi
(74) *Attorney, Agent, or Firm* — Ballard Spahr LLP

(57) ABSTRACT

A dispenser assembly with a compartment for storing clean tissues and a compartment in the assembly for storing used tissues. A partition wall separates the compartments and can move to enlarge the space for the storage of used objects such as tissues. The dispenser assembly may be sized to fit within an automobile cup holder.

5 Claims, 8 Drawing Sheets

DISPENSER ASSEMBLY WITH STORAGE COMPARTMENT

CROSS-REFERENCE TO RELATED APPLICATION

This application is a continuation of application Ser. No. 16/103,153, filed Aug. 14, 2018, entitled DISPENSER ASSEMBLY WITH STORAGE COMPARTMENT which claims the priority of and benefit to U.S. Provisional Patent Applications Nos. 62/546,274 and 62/546,262, both filed on Aug. 16, 2017, the entire contents of which are incorporated by reference herein.

FIELD OF THE INVENTION

The present invention relates generally to a dispenser assembly having an integrated storage receptacle. In an exemplary embodiment, disposable tissues are dispensed from the first compartment of the dispenser assembly through a first access region and once used the disposable tissues are stored in a second compartment of the dispenser assembly by inserting the tissues through an opening defined as the second access region. A partition wall separates the first and second compartments. The dispenser assembly may be shaped so that it fits in the cup-holder of an automobile so that it may easily be used while driving.

BACKGROUND OF THE INVENTION

Conventional tissue dispensers are numerous in the prior art and serve to dispense disposable tissues one at a time to one in need of a tissue. However, these existing tissue dispensers do not address the need to dispose of used tissues, which often carry infectious agents discharged from sneezes and coughs. While a conventional waste basket at times serves the function of receiving used tissues, waste baskets or other waste receptacles are not always available to receive used tissues.

The problem of tissue disposal is particularly acute for occupants of an automobile where waste receptacles are frequently unavailable and where individuals spend considerable time commuting to and from work.

Accordingly, there has been a long-standing need to create a simple apparatus that both dispenses disposable tissues and provides a place to receive the tissue once used.

SUMMARY OF THE INVENTION

The present invention generally relates to a dispenser assembly for objects such as disposable tissues that also serves as a receptacle for used objects, such as used tissues. In an exemplary embodiment, the dispenser assembly is used for tissues and is constructed so that it fits in the cup-holder of an automobile. In an exemplary embodiment, the disposable tissue dispenser can be mounted on the dashboard of the vehicle.

One exemplary embodiment takes the form of a cylindrical or frustoconical (truncated cone-like) housing having a first or upper surface (i.e., a closed top), a second or lower surface (i.e., a closed bottom) and a partition wall separating the housing interior into two, i.e., first and second, compartments. The first surface includes two perforated access regions, the first access region provides access upon opening to a stack of interleaved tissues in the first compartment, and the second access region allows disposal of used tissues within the second compartment.

In embodiments, the first surface includes a single peel off lid that upon removal via a user pulling a tab, provides access to both the first and second compartments. In embodiments, the housing is formed of paper, and further may be formed of recycled paper.

In an alternative embodiment, the partition takes the form of a cylindrical or tubular structure, for example coaxial, within a central axis of the housing. In some variants of this embodiment, the tissues are provided as an interconnected series of tissues wound around the tubular partition and dispensed through the first access region. In some embodiments, the first or second access region is positioned in a sidewall of the housing.

One of ordinary skill in the art will appreciate that the dispenser assembly can be used for numerous types of materials beyond tissues, such as wet wipes or other non-woven materials. The dispenser assembly can also be used to store other types of objects such as wrapped snack foods, with the wrapping being disposed of in the second compartment after the wrapped snack food is removed from the first compartment.

The features and advantages of the present invention will be more fully understood by reference to the following detailed description of various exemplary embodiments of the present invention.

BRIEF DESCRIPTION OF THE DRAWINGS

Exemplary embodiments of this invention will be described with reference to the accompanying figures wherein.

DETAILED DESCRIPTION OF THE EXEMPLARY EMBODIMENTS

Figure 1:
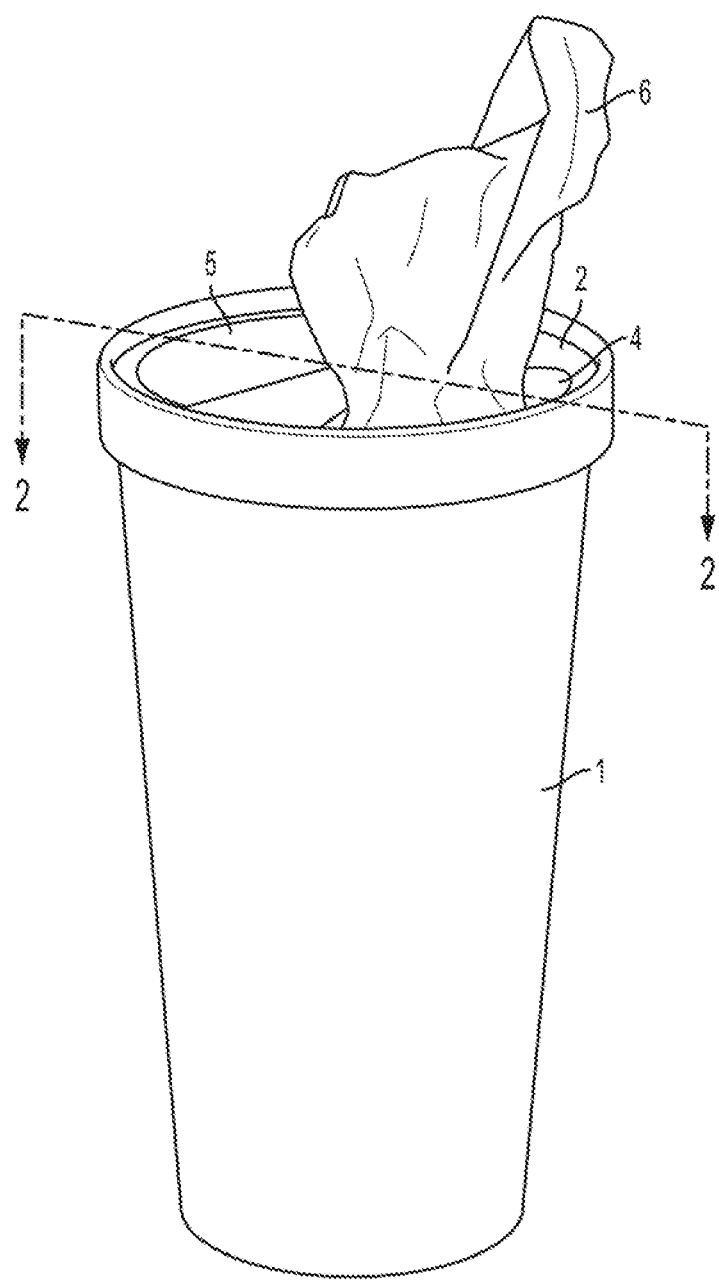
FIG. 1 is a perspective view of a dispenser assembly.

Initially referring to FIG. 1 for the structure of the present invention, the embodiment of the dispenser assembly described herein includes a housing comprising perimeter wall 1, first surface 2, and second surface 3 (not shown). In a preferred embodiment, perimeter wall 1 is a frustoconical surface capped on both ends by first surface 2 and second surface 3 (not shown) with perimeter wall 1 having a larger diameter where it meets the first surface and a smaller diameter where it meets the second surface. In embodiments, the lower portion of perimeter wall 1 has a diameter or width dimension sized to engage in an interference fit within the automobile cup holder and an upper portion having a diameter or width dimension at least 10, 20, 30, 40, 50, 60, 70, 80, or 90% greater than the diameter or width of the lower portion to allow for more storage of used objects such as tissues into the second compartment (not shown) through second access region 5 of the dispenser. In a preferred embodiment, the frustoconical surface of perimeter wall 1 is sized so that the dispenser assembly fits in a standard-sized automobile cup holder.

In other embodiments (not shown), perimeter wall 1 can be constructed of other shapes such as rectangular, or other angular shapes, so long as it is bounded by first surface 2 and second surface 3. In an exemplary embodiment, first surface 2 and second surface 3 are planar, but these surfaces can also be other shapes so long as they define a housing in conjunction with perimeter wall 1 to form an interior volume. Alternatively, first surface 2 and second surface 3 can be rounded or domed to increase the interior volume of the housing.

Tissue 6 is shown emerging from first access region 4. In other embodiments, other objects, such as wet wipes, wrapped food items, or other items can be stored within the first compartment of the interior volume and removed through first access region 4.

Figure 2:
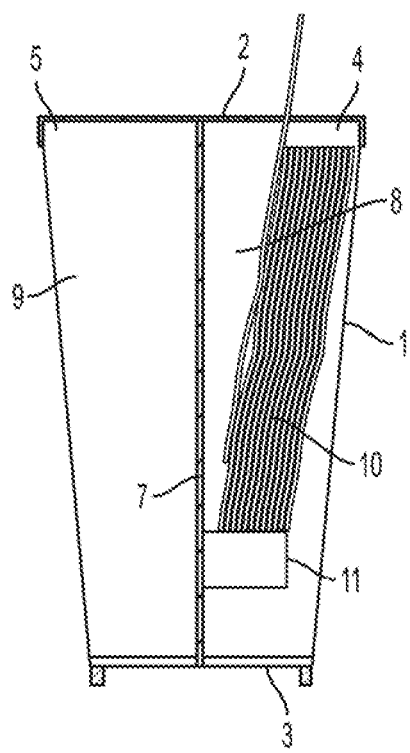
FIG. 2 is a section view of the dispenser assembly taken along the line 2-2 in FIG. 1 in the direction shown by the arrows.

Referring to FIG. 2, a section view of the dispenser assembly taken along the line 2-2 in FIG. 1 in the direction shown by the arrows, is shown. Partition wall 7 extends laterally from two portions of perimeter wall 1 and, as shown in FIG. 2, extends from first surface 2 to second surface 3. In the embodiment shown in FIG. 2, partition wall 7 bisects the interior volume of the housing into two equally sized volumes, first compartment 8 and second compartment 9. In other embodiments (not shown) the first and second compartments are of unequal size.

The size of the first and second compartments is defined by the placement of partition wall 7. In embodiments, partition wall 7 is constructed of a pliant material, such as cardboard, or an elastomeric material, such that when second compartment 9 is filled with objects, such as used tissues, a bulge can form in partition wall 7, or partition wall 7 can bend with its edges shifting position on perimeter wall 1 to enlarge second compartment 9 (not shown) thus providing more room for used objects being inserted into second compartment 9. In an embodiment (not shown), partition wall 7 is a side of a plastic bag with the remainder of the plastic bag containing tissues for dispensing through first access region 4. In this embodiment, the top opening is joined to top surface 2 at the opening of first access region 4. As the items on one side of perimeter wall 7 are dispensed from first compartment 8, partition wall 7 can move into first compartment 8 increasing the volume of second compartment 9.

First compartment 8 and second compartment 9 can each be accessed through an access region, shown in FIG. 2 as first access region 4, for access into first compartment 8, and second access region 5, for access into second compartment 9. First access region 4 and second access region 5 are shown as being located on first surface 2, but in embodiments these regions can be located either on perimeter wall 1 or second surface 3 so long as first access region 4 provides access to first compartment 8 and second access region 5 provides access to second compartment 9.

Interleaved tissues 10 are shown in first compartment 8, which can be accessed through first access region 4. While interleaved tissues are shown in this exemplary embodiment, many other types of objects, ranging from wet wipes to wrapped foods, can be stored in first compartment 8. In an exemplary embodiment, partition wall 7 includes a small flap 11 which is cut out of partition wall 7. Flap 11 can be positioned so that it enters first compartment 8 to support interleaved tissues 10, keeping them closer to the top of first compartment 8 and nearer to first access region 4.

Figure 3:
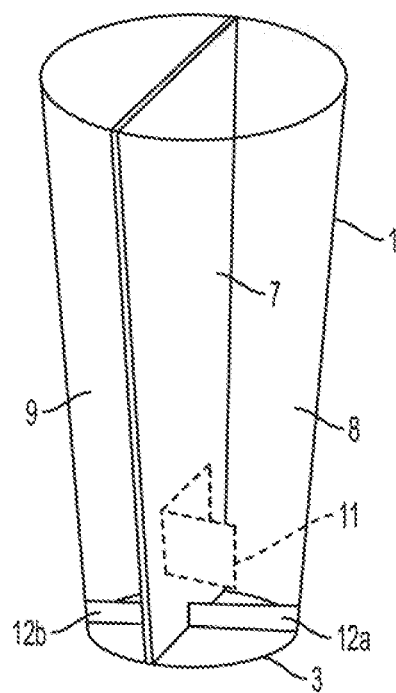
FIG. 3 is a perspective view showing the interior of the dispenser assembly.

FIG. 3 illustrates a perspective view of the interior of the dispenser assembly. Partition wall 7 is shown extending laterally from two portions of perimeter wall 1 and extending from second surface 3 to first surface 2 (not shown). Partition wall 7 is held in place by being placed between stabilizer 12a and 12b. In other embodiments, partition wall 7 can be attached to second surface 3 by any conventional means including gluing or the use of other adhesive. Turning back to FIG. 3, first compartment 8 (shown without any objects, such as tissues) and second compartment 9 are shown separated by partition wall 7. Flap 11, shown in this embodiment, is illustrated extending into first compartment 8. In other embodiments (not shown), partition wall 7 lacks flap 11.

Figure 4:
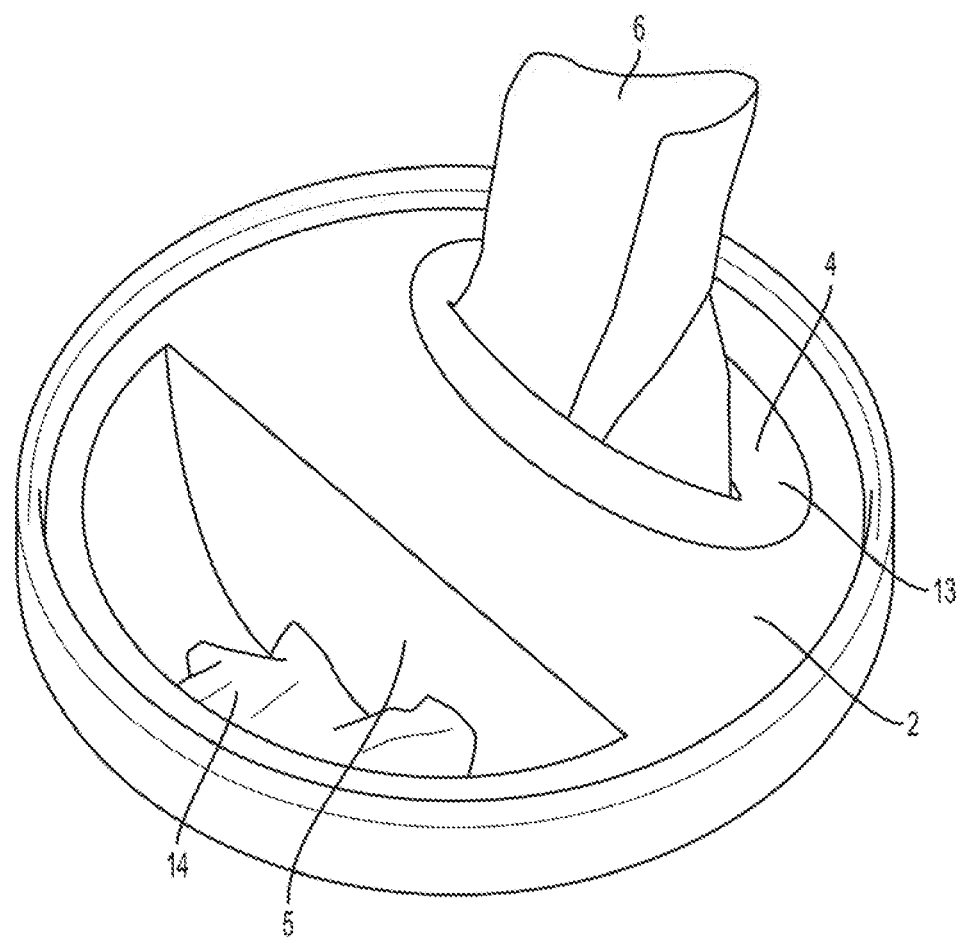
FIG. 4 is a perspective view of the lid of the dispenser assembly.

FIG. 4 illustrates a detailed view of first surface 2. In an exemplary embodiment, first surface 2 is formed in the shape of a lid so that it easily can be joined and removed from perimeter wall 1, permitting removal of used objects (i.e., tissues) from the second compartment, and also permitting refill of objects (i.e., tissues) in the first compartment.

First surface 2 is shown with first access region 4 and second access region 5. In an exemplary embodiment, first surface 2 is fabricated of one piece of material, such as cardboard, plastic or the like, and the material is perforated to define the scope of first access region 4 and second access region 5. In an embodiment, the first and/or second perforated access regions includes a perforation pattern that may define a closed loop. These access regions may be opened by applying pressure to the perforated sections to create openings. In an alternative embodiment, a pull tab can be attached to one or both perforations and when pulled create one or both openings. In an alternative embodiment, first surface 2 can be constructed with first access region 4 and second access region 5 opened during the manufacturing process by die cutting or the like. In such a configuration, the first surface includes a peel-off lid (not shown) which then exposes the first and second access regions. In an embodiment, a pull-tab is attached to this peel-off lid to facilitate opening of the lid. In alternate embodiments, the perforations along the perimeter of the first access region 4 or second access region 5 include a perforated pattern that does not define a closed loop. In an embodiment the perimeter of the second access region 5 includes a scored fold region and a perforated pattern that defines an arc intersecting the scored fold region, to more easily permit the opening of second access region 5 as shown in FIG. 4 with the portion of the first surface that had been in the second access region folded at the scored fold region.

In the exemplary embodiment shown in FIG. 4, the opening formed at first access region 4 is covered with a flexible plastic layer 13 with a slit that permits objects (such as tissue 6, shown in FIG. 4) to be removed from first compartment 8 individually. Plastic layer 13 may be constructed of transparent PVC (polyvinylidene chloride) or LDPE (low-density polyethylene). In an exemplary embodiment, the dispenser assembly is manufactured with first surface 2 being made of cardboard, and a perforated section along the edges of first access region 4, which permits the cardboard to be removed along the perforations exposing first access region 4. In an embodiment, a pull tab is attached to the cardboard within the perforated section to permit easy removal of the cardboard section. In an embodiment, plastic layer 13 covers the opening to first access region 4. Plastic layer 13 has a slit to permit the withdrawal of objects such as tissue 6, while at the same time preventing contaminants from entering the first compartment. In an embodiment (not shown), the first tissue to be extracted from the first compartment has a pull tab to facilitate removal of the tissue.

In an embodiment, a second perforation is provided on the cardboard in a semi-circular shape, which permits the opening of second access region 5, as shown in FIG. 4. In an alternate embodiment the perforation extends the full length of second access region 5 permitting removal of the entire cardboard portion within the perforation to form second access region 5.

Returning to FIG. 4, used objects, such as used tissues 14, are deposited into second compartment 9 (not shown) through second access region 5. In an embodiment (not shown), a plastic layer with a slit, similar to plastic layer 13 as used in connection with first access region 4, covers the opening for second access region 5 to prevent unwanted materials from entering second compartment 9.

Though shown as a cap to be joined with perimeter wall 1, similar to the lid of a coffee cup, first surface 2 can be fabricated in many ways, including as part of an integral piece of the housing, together with perimeter wall 1 and second surface 3. In a preferred embodiment, second access region 5, which receives used objects such as tissue 14, has a larger opening than the opening for first access region 4.

Figure 5C:
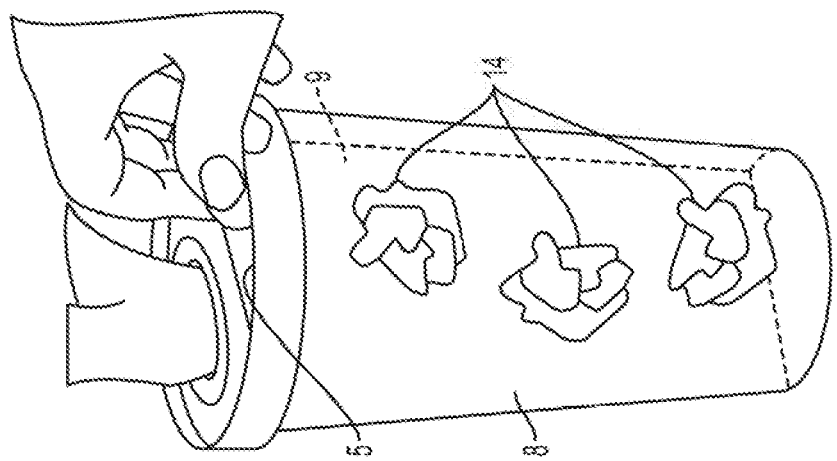
FIG. 5C illustrates a disposable tissue being inserted into the dispenser assembly embodiment of FIG. 5A.
Figure 5B:
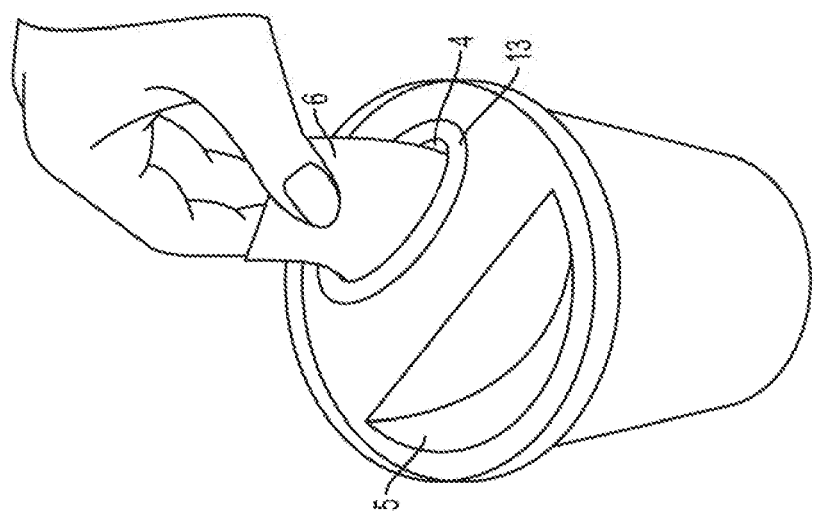
FIG. 5B illustrates a disposable tissue being removed from the dispenser assembly embodiment of FIG. 5A.
Figure 5A:
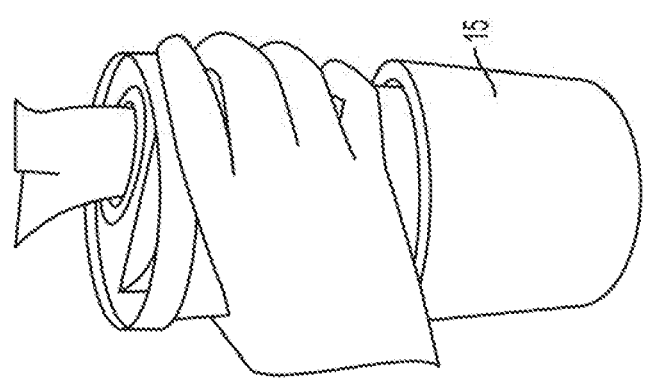
FIG. 5A illustrates an embodiment of the dispenser assembly being placed in a cup holder.

FIGS. 5A-5C provide illustrations of the dispenser assembly as used in an exemplary embodiment. FIG. 5A shows the dispenser assembly in an exemplary embodiment sized so that it can fit in a cup holder 15, which can be a cup holder, for example, in an automobile. FIG. 5B illustrates the dispenser assembly in use in an exemplary embodiment where the dispenser assembly is storing tissues. In this embodiment, tissue 6 is being shown removed from first access region 4, through plastic layer 13. FIG. 5C illustrates the disposal of tissues 14 through second access region 5 into second compartment 9.

Figure 6A:
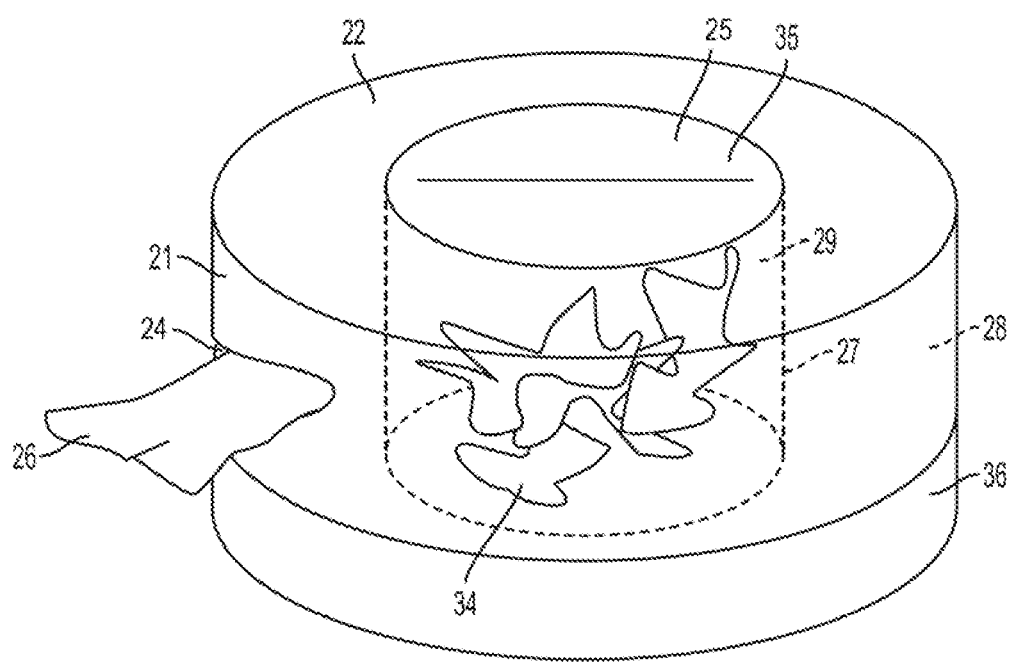
FIG. 6A illustrates a perspective view of the dispenser assembly embodiment of FIG. 6A, shown dispensing a disposable tissue and holding used disposable tissues.

FIG. 6A illustrates an alternative embodiment wherein partition wall 27 is cylindrical in nature forming first compartment 28 which surrounds second compartment 29, with first access region 24 contained on perimeter wall 21. Objects such as tissue 26 are stored within first compartment 28, and after use are placed in second compartment 29 through second access region 25. In an alternative embodiment (not shown), objects such as tissue are stored within second compartment 29 and after use are placed in first compartment 28.

In embodiments, a plastic layer 35, shown in FIG. 6A with a slit, covers the opening to second access region 25 to prevent unwanted items from entering second compartment 29 and to prevent objects disposed in second compartment 29, such as used tissues 34, from exiting second compartment 29.

In the embodiment disclosed by FIG. 6A, partition wall 27, shown as being elliptical, forming an elliptic cylinder, may be a square, rectangular, triangular, circular, oval, or oblong tube extending generally transverse, for example at approximately 70, 80, or 90 degrees, relative to a width dimension of the dispenser assembly. In an embodiment, partition wall 27 is formed of a cardboard tube.

Figure 6B:
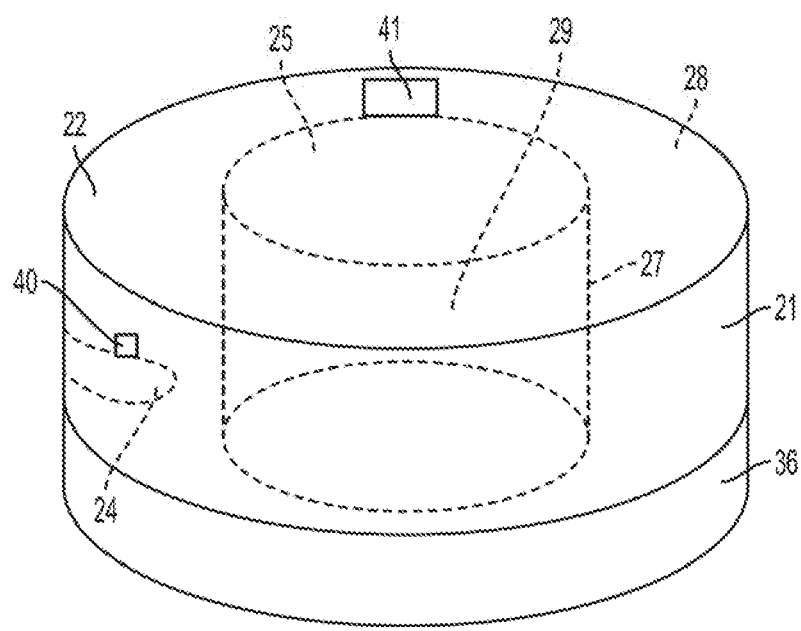
FIG. 6B illustrates a perspective view of an embodiment of the dispenser assembly for use, for example, on the dashboard of an automobile.

FIG. 6B illustrates pull tabs 40 and 41 used to open first access region 24 and second access region 25. In embodiments with pull tabs 40 and 41, first access region 24 and second access region 25 are initially covered with material that comprises the surface on which the access region is found. For example, in FIG. 6B, first access region 24 is covered with material from perimeter wall 21, and second access region 25 is covered with material from top surface 22. Pull tab 40 removes the portion of perimeter wall 21 covering first access region 24. Pull tab 41 removes the portion of top surface 22 covering second access region 25. In an exemplary embodiment, bottom surface (not shown) is set on top of base 36.

Figure 7A:
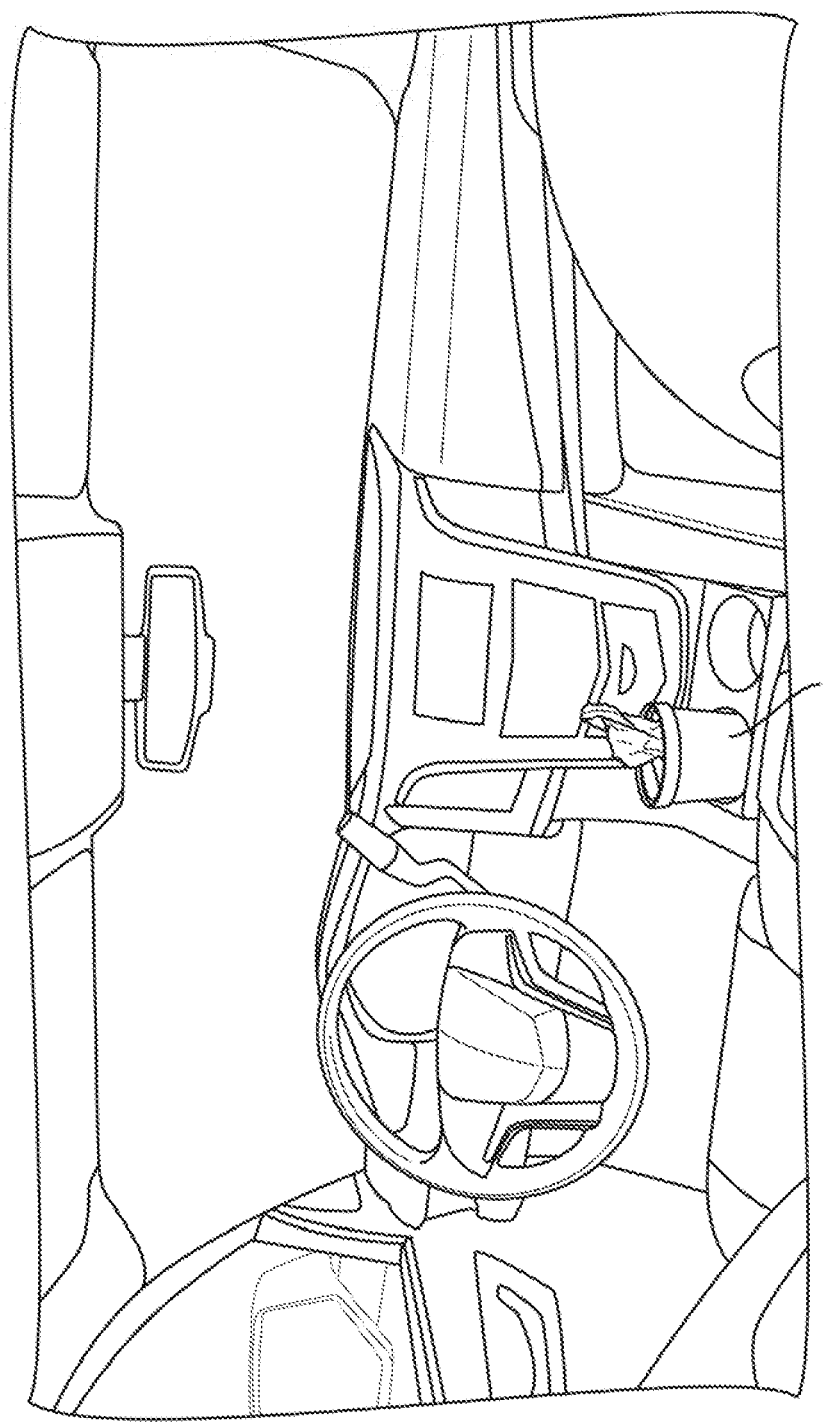
FIG. 7A illustrates the dispenser assembly in an exemplary embodiment located in a cup holder of an automobile.

FIG. 7A illustrates the dispenser assembly of FIGS. 1-5C in a cup-holder of an automobile. In the embodiment illustrated in FIG. 7A, perimeter wall 1 of the dispenser assembly is sized to conform with a standard dimension of a coffee cup so that it fits within a standard automobile cup holder. In an embodiment (not shown), the bottom surface includes a self-adhesive region, with the self-adhesive region covered by removable release liner and configured to removably adhere to a portion of the cup holder. One of ordinary skill in the art would appreciate that many other attachment means are possible, including the use of hook-and loop fastener.

Figure 7B:
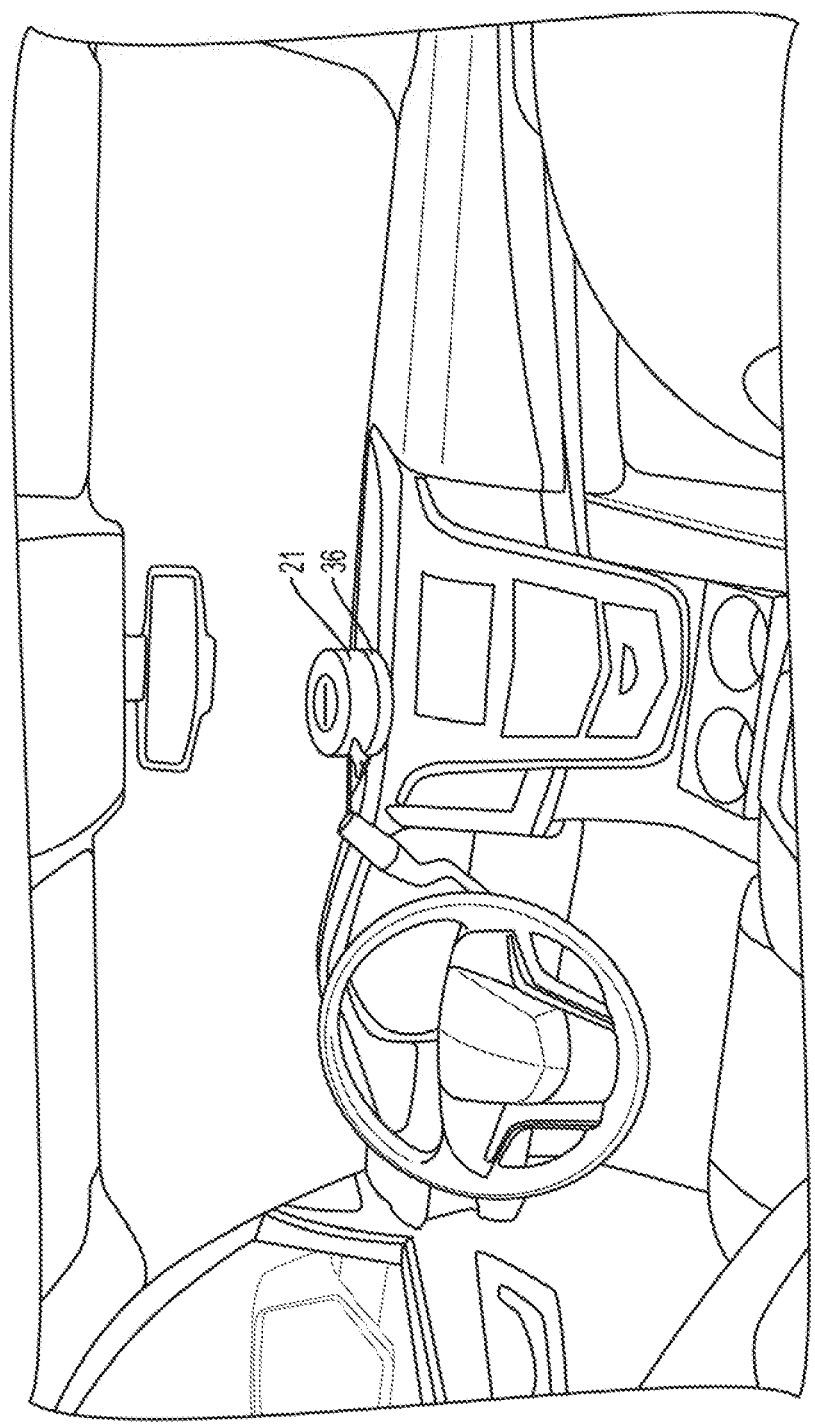
FIG. 7B illustrates the disposable tissue holder in an exemplary embodiment located on the dashboard of an automobile.

FIG. 7B illustrates the dispenser assembly of FIGS. 6A-6B mounted on the dashboard of an automobile with base 36 secured to the top of the dashboard conventional means such as adhesive means.

In the foregoing specification, specific exemplary embodiments have been described. However, one of ordinary skill in the art will appreciate that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Now that embodiments of the present invention have been shown and described in detail, various modifications and improvements thereon will become readily apparent to those skilled in the art. Accordingly, the exemplary embodiments of the invention, as set forth above, are intended to be illustrative, not limiting. The spirit and scope of the present invention is to be construed broadly.

The invention claimed is:

1. A dispenser assembly comprising:
   a housing having a perimeter wall, an upper surface and a lower surface at either end of the perimeter wall defining an interior volume within the housing; and
   a partition wall attached to the lower surface, wherein
   the partition wall extends laterally from two portions of the perimeter wall and extends between the upper surface and the lower surface, wherein the partition wall separates the interior volume of the housing into first and second compartments, wherein
   the first compartment contains objects for dispensing and is accessible through a first access region, and
   the second compartment is accessible via a second access region,
   the partition wall is constructed of a pliant material and is adapted to shift position along the perimeter wall increasing the volume of one or more of the first or second compartment.

2. The dispenser assembly of claim 1, wherein
the perimeter wall is frustoconical with the portion towards the lower surface having a diameter or width dimension sized to engage in an interference fit within an automobile cup holder.

3. The dispenser assembly of claim 1 wherein the objects for dispensing are a plurality of tissues and further wherein the first of the plurality of tissues for dispensing has a pull tab to facilitate removal of the first tissue through the first access region.

4. The dispenser assembly of claim 1, wherein the first access region overlies a flexible region having a slit for accessing the first compartment.

5. The dispenser assembly of claim 4, wherein the flexible region is fabricated of one or more of PVC or LDPE.

\* \* \* \* \*